US006944094B1

(12) United States Patent
Thomsen et al.

(10) Patent No.: US 6,944,094 B1
(45) Date of Patent: Sep. 13, 2005

(54) HIGH RESOLUTION DETERMINATION OF SEISMIC POLAR ANISOTROPY

(75) Inventors: Leon A. Thomsen, Houston, TX (US); Joseph A. Dellinger, Houston, TX (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

(21) Appl. No.: 09/445,355

(22) PCT Filed: Jun. 18, 1998

(86) PCT No.: PCT/US98/12866

§ 371 (c)(1),
(2), (4) Date: Dec. 10, 1999

(87) PCT Pub. No.: WO98/59264

PCT Pub. Date: Dec. 30, 1998

Related U.S. Application Data

(60) Provisional application No. 60/050,389, filed on Jun. 20, 1997.

(51) Int. Cl.⁷ .................................................. G01V 1/48

(52) U.S. Cl. ................................ 367/57; 367/25; 702/6

(58) Field of Search ...................... 367/25, 57; 702/6, 702/14, 18

(56) References Cited

U.S. PATENT DOCUMENTS

| 4,817,061 | A | * | 3/1989 | Alford et al. | 367/75 |
|---|---|---|---|---|---|
| 4,839,869 | A | * | 6/1989 | Corcoran | 367/53 |
| 4,907,206 | A | | 3/1990 | Rai et al. | 367/68 |
| 4,933,913 | A | * | 6/1990 | Thomsen | 367/75 |
| 5,136,554 | A | * | 8/1992 | Thomsen et al. | 367/75 |
| 5,285,422 | A | * | 2/1994 | Gonzalez et al. | 367/53 |
| 5,696,735 | A | * | 12/1997 | Krebs | 367/50 |
| 6,002,642 | A | * | 12/1999 | Krebs | 367/73 |
| 6,292,754 | B1 | * | 9/2001 | Thomsen | 702/14 |

FOREIGN PATENT DOCUMENTS

EP 0296987 6/1988 ............ G01V/1/40

OTHER PUBLICATIONS

Alkhalifah et al, Velocity analysis . . . case study, May 1996, Leading Edge, vol. 15, #5, pp. 371–378; Abstract Only Herewith.*

Byun et al, "Anisotropic velocity analysis . . . ", Geophysics, vol. 54, #12, pp. 1564–1574, Dec. 1989; Abstract Only Heewith.*

Li et al; Converted wave Moveout . . . transverse isotropy, 61st EAGE Conf., Jun. 11, 1999, PAP No. 4–35; Abstract Only Herewith.*

Alkhalifah, T. and I. Tsvankin, "velocity analysis for transversely isotropic media," Geophysics, Sep.–Oct. 1995, Soc. Exploration Geophysicists, USA, vol. 60, No. 5, pp. 1550–1566.

(Continued)

*Primary Examiner*—Ian J. Lobo
(74) *Attorney, Agent, or Firm*—James A. Gabala; Terry L. Watt

(57) ABSTRACT

A method and apparatus for high-resolution measurement of seismic anisotropy, comprising: a recording system, a borehole having an axis that is deviated from the vertical by a known acute angle; a housing that is adapted to travel within the borehole and that is in electronic communication to the recording system, the housing carrying at least one source of acoustic energy and at least two receivers for receiving acoustic energy from geological formation elements and/or lithologic horizons and from the source; and processing means for operating the source and the receivers, for recording the position of the housing in the borehole and for processing data from said recording system in terms of both the direct raypaths from the source to the receivers and the indirect raypaths from the source through geological formation elements and/or lithologic horizons to the receivers to obtain measures of at least the seismic polar anisotropy parameters $V_0$, $\eta$, and $\delta$.

37 Claims, 3 Drawing Sheets

OTHER PUBLICATIONS

Thomsen, L., "Weak elastic anistrophy," Geophysics, Oct. 1986, USA, vol. 51, No. 10, pp. 1954–1966.

Gavin PH et al, "traitement des diagraphies acoustiques deuleme partie separation des ondes en diagraphie acoustique," Revue de l'Institute Francais du Petrole, vol. 47, No. 2, Mar. 1992, pp. 155–178.

Thomsen, 1993. Weak anistropic reflections, in "Offset–Dependent Reflectivity—Theory and Practice of AVO Analysis," Castagna, ed., Soc. Expl. Geoph., Tulsa, pp. 103–114.

Tsvankin, I. and L. Thomsen. 1994. Nonhyperbolic reflection moveout in anisotropic media, Geophysics 59 (B), pp. 1290–1304.

Utard, M., C. Naville, and N. Rehbinder, 1984. Study of reflected events observed on microseismograms recorded with the EVA acoustic logginf system, $9^{th}$ Intl. Formation Evaluation Transactions, Soc. Prof. Well Log Analysts (Parts).

Alkhalifah, T., 1993. "Anisotrophy processing in vertically inhomongeneous media," Soc. Expl. Geoph. Expdd. Absts., 65, 348–353.

Gaiser, J. 1989. Transverse isotropic velocity estimates from slowness and displacement measurements, Ph.D. Thesis, University of Texas at Dallas.

Slotnick, M. M., 1959. Lessons in Seismic Computing, Soc. Expl. Geoph., Tulsa, OK.

* cited by examiner

HIGH RESOLUTION DETERMINATION OF SEISMIC POLAR ANISOTROPY

CROSS-REFERENCE

This patent application claims the benefit of U.S. Provisional Patent Application No. 60/050,389 filed on Jun. 20, 1997.

TECHNICAL FIELD

This invention relates to the general subject of seismic exploration and, in particular, to methods and devices to measure seismic anisotropy in-situ, with improved accuracy and resolution.

BACKGROUND OF THE INVENTION

It is well-known to those familiar with the art of exploration seismology that the rocks of the earth's subsurface exhibit seismic anisotropy, and that failure to account for this can confuse the interpretation of seismic data. For example, surface-reflection seismic data acquired by experiments in anisotropic rock, but interpreted via isotropic theory, can yield incorrect estimates of reflection depths, incorrect analysis of Amplitude-vs.-Offset (AVO) measurements, etc.

Seismic anisotropy is that property of materials by which the velocity of seismic waves (taken here as P-waves) depends upon the direction of travel of such waves. Polar anisotropy is that special case where the variation is primarily or exclusively with the polar angle (i.e., the angle from the vertical, rather than the azimuthal angle). It can be caused, for example by preferred alignment of rock grains (as in shales), or by sedimentary layering on a scale much smaller than the seismic wavelength. Because such layering is common in the earth's crust, and because seismic waves of differing wavelength are affected differently by such layering, the anisotropy measured by any seismic experiment depends upon the wavelengths used in the experiment Hence, experimental results from widely differing wavelength bands may not be combined to estimate the anisotropy (more on this later). Since subsurface rocks in different places possess seismic anisotropy to varying degrees, accurate local measurements of the anisotropy are routinely required in order to make corrections, thereby avoiding errors such as those mentioned above.

FIG. 1 is a good starting place to illustrate the problem. In a typical seismic experiment, seismic waves are emitted by a source at S, reflected by a rock-layer at depth, z and received by a receiver at R, separated from S by a distance x. With the geometry shown, and if the rock is uniform and isotropic, it is well-known that the arrival time t(x) of the wave arriving at offset x is given by:

$$t^2(x) = t_0^2 + \frac{x^2}{V^2} \tag{1}$$

where $t_0$ is the vertical travel time or the arrival time (of the wave) at the special place where x=0 (i.e., the place of normal incidence), and where V is the velocity of seismic waves. The quantities V and $t_0$ are conventionally determined by measurements of t(x), with V determined as the parameter which best fits the hyperbolic variation of arrival time with offset The (initially unknown) depth z to the reflector is given by:

$$z = \frac{V t_0}{2} \tag{2}$$

With V and $t_0$ measured, the depth z is thereby determined.

Of course, in any practical situation, the geometry will be more complicated than that shown, and the material properties will not be uniform. For example, FIG. 2 illustrates the situation where the reflector is dipping at angle φ. It is well known (See Slotkin, M. M., "Lessons in Seismic Computing," Soc. Expl. Geoph., 1959, Tulsa, Okla., the teachings of which are incorporated herein by reference) that:

$$t^2(x) = t_0^2 + \frac{x^2}{V^2} + \left(\frac{2t_0 x}{V}\right)\sin\phi \tag{3}$$

where $t_0$ is given by Equation (2). However, the simple situation shown in FIG. 1 suffices to illustrate the difficulties which arise if the rock is considered to be anisotropic.

If the rock is anisotropic, then Equation (1) no longer applies as written. To generalize it for anisotropy, one has to specify what sort of anisotropy the rocks possess. In the simplest anisotropic case, the velocity varies only with the incidence angle θ shown in FIG. 1, and not with azimuthal angle. In this (i.e., polar anisotropic) case, it is well-known that the angular variation of velocity depends upon four material parameters, following a complicated formula known to those skilled in the art.

However, it is also well-known that, if the anisotropy is "weak," then the P-wave velocity $V_p(\theta)$ depends upon only three parameters which may be chosen (modifying Thomsen, "Weak elastic anisotropy," Geophysics, 1986, 51(10), pp. 1954–1966, the teachings of which are incorporated herein by reference) as:

$$V_P(\theta) = V_0[1 + \delta \sin^2(\theta) + \eta \sin^4(\theta)] \tag{4}$$

where $V_0$ is the velocity in the special case that θ=0 (i.e. it is the vertical velocity), and δ and η are two non-dimensional anisotropic parameters. Materials with "weak" polar anisotropy have both δ and η much less than one. The horizontal velocity $V_p(\eta=90")$ is given by:

$$V_p(\theta=90°) = V_0[1+\delta+\eta] \tag{5}$$

so that $$\epsilon = \delta + \eta \tag{6}$$

is the horizontal anisotropy parameter. The parameter δ controls the near-vertical variation of velocity, and η is called the anelliptic anisotropic parameter.

With this notation, one can generalize Equation (1) to the Vertical Traversely Isotropic case:

$$t^2(x) = t_0^2 + \frac{x^2}{V_{mo}^2} \tag{7}$$

for small offsets X≦Z. The parameter $V_{mo}$ called the "moveout velocity" or dx/dt, is given in terms of quantities previously defined by:

$$V_{mo} = V_0\sqrt{1+2\delta} \approx V_0[1+\delta] \tag{8}$$

Further, the unknown depth z is given, in terms of the vertical velocity $V_0$ or dz/dt, by:

$$z = \frac{V_0 t_0}{2} \quad (9)$$

(compare to Equation (2)). Those skilled in the art will recognize that the vertical velocity and the moveout velocity are features of the P-wave velocity function.

However, the vertical velocity $V_0$ is not given by the hyperbolic variation of t with x, which is $V_{mo}$ and which includes an anisotropic correction (see Equation (8)). Hence, although $V_{mo}$ is known, $V_0$ itself is not known, and so the measured vertical travel time $t_0$ may not be interpreted to yield the depth. Thus, because of the presence of anisotropy, neither the anisotropy itself nor even the depth can be determined accurately.

If longer offsets, x>z, are acquired, then the arrival times are given by a formula more complicated than that given by Equation (7) (i.e., with an additional (non-hyperbolic) term involving the anellistic anisotropy parameter η; See Tsvankin and Thomsen, "Nonhyperbolic Reflection Moveout in Anisotropic Media," *Geophysics,* 1994, 59(8), pp. 1290–1304, the teachings of which are incorporated herein by reference). This non-hyperbolic term has been specified (See Alkhalifah, "Anisotropy Processing in Vertically Inhomogeneous Media", *Soc. Expl. Geoph, Expdd. Absts.,* 1993, 65, 348–353, the teachings of which are incorporated herein by reference) in terms of η, generalized as:

$$\eta = \frac{(\varepsilon - \delta)}{(1 + 2\delta)}.$$

However, this additional term helps determine the anellyptic anisotropy parameter η, rather than the vertical velocity $V_0$ and/or the near-surface anisotropy parameter δ, so the problem remains.

Heretofore, the only practical seismic way to determine the vertical velocity $V_0$ has been to measure it (e.g., by drilling a hole, and by using Equation (8)). Thus, when both the vertical velocity $V_0$ and the moveout velocity $V_{mo}$ are determined, the near-surface anisotropy parameter δ may by found using Equation (8). This set of operations then determines all three parameters ($V_0$, δ, η) with seismic resolution (i.e., with the resolution of a seismic wavelength or more (e.g., several hundred meters)). For some purposes, this is sufficient, but for others it is not For example, proper interpretation of the AVO effect requires an estimate of the near-surface anisotropy parameter δ with much greater resolution. The AVO effect is often used to detect the presence of gas in the pore-space of the rock, but this detection can be confused by anisotropy.

The argument is as follows:

After certain "true relative amplitude" corrections have been performed, the amplitudes of the received signals in the reflection experiment of FIG. 1 may be interpreted in terms of the reflectivity. It is well-known (See Thomsen, "Weak Anisotropic Reflections, in Offset-Dependent Reflectivity—Theory and Practice of AVO Analysis," Castagna, ed., *Soc. Expl Geoph.,* 1993, Tulsa, pp. 103–114, the teachings of which are incorporated herein by reference) that, if the contrast in elastic properties across the reflecting horizon is small, the reflectivity at small-to-moderate angles may be written in the isotropic case as:

$$R_p(\theta) = R_0 + R_1 \sin^2(\theta) \quad (10)$$

where $$R_0 = \frac{\Delta Z}{2Z} \text{ and} \quad (10a)$$

$$R_1 = \frac{1}{2}\left(\frac{\Delta V}{V} - \left(\frac{2V_s}{V_p}\right)^2 \frac{\Delta G}{G}\right) \quad (10b)$$

Here, Z is the average P-wave impedance across the horizon, $V_s$ is the average shear-wave velocity, and G is the average shear modulus. ΔZ, ΔG and ΔV are the corresponding jumps across the reflecting horizon. Anomalous values of $R_1$ result from the presence of gas on one side of the horizon, and this is a useful exploration signature. However, anomalous values may also result from anisotropy.

The polar anisotropic version (See Thomsen, 1993, supra, and Rueger, "P-Wave Reflection Coefficients for Transversely Isotropic Media with Vertical and Horizontal Axis of Symmetry," *Soc. Expl. Geoph. Expdd. Absts.* 1995, 65, 278–281, the teachings of which are incorporated herein by reference) of Equation (10) is:

$$R_p(\theta') = R_0' + R_1' \sin^2\theta' \quad (11)$$

where: θ' is the wave-front-normal angle;

$$R_0' = \frac{\Delta Z_0}{2Z_0}; \text{ and} \quad (11a)$$

$$R_1' = \frac{1}{2}\left(\frac{\Delta V_0}{V_0} - \left(\frac{2V_{s0}}{V_0}\right)^2 \frac{\Delta G_0}{G_0} + \Delta\delta\right) \quad (11b)$$

Here, $Z_0$ is the vertical P-impedance, $V_0$ is the vertical P-velocity, $V_{s0}$ is the vertical shear velocity, $G_0$ is the vertical shear modulus, and Δ signifies a jump at the reflecting horizon. $R_1'$ also contains the jump in anisotropy parameter δ across the reflecting horizon. The ray angle θ' differs from the ray angle θ by an anisotropic correction factor involving δ (See Thomsen, 1986, supra).

It is clear from Equation (11) that, if the anisotropic contribution is present but ignored, then an anomalous value of $R_1'$, due to gas may be masked (i.e., a false negative) or mimicked (i.e., false positive) by the anisotropy. Therefore, in order to interpret $R_1'$, in terms of gas, the anisotropic contribution must first be estimated and corrected for. However, this estimation must be locally determined, with a resolution of ¼ wavelength or less; hence, the process of Equations 8 and 9, offering resolution of more than one wavelength, is not suitable.

Thus, a practical method and apparatus to do this with suitable resolution is needed.

SUMMARY OF THE INVENTION

Heretofore, no method was available to measure seismic anisotropy in-situ, with sufficient accuracy and resolution to solve many of the difficulties facing those skilled in the art.

In accordance with the present invention an improverd method and apparatus is disclosed for measuring seismic polar anisotropy in-situ in a region of the earth that is characterized by geological formation elements and/or lithologic horizons. In one embodiment, the apparatus of the invention comprises: a recording system; a borehole having an axis that is deviated from the vertical by a known acute angle; a housing that is adapted to travel within the borehole and that is in electronic communication to the recording system, the housing carrying at least one source of acoustic energy and at least two receivers for receiving acoustic energy from geological formation elements and/or the lithologic horizons and from the source; and processing means for operating the source and the receivers, for recording the position of the housing in the borehole and for processing the recorded data in terms of both the direct raypaths from the source to the receivers and the indirect raypaths from the source through geological formation elements and/or lithologic horizons that are traversed by the source and the receivers so as to obtain measures of at least some of the seismic polar anisotropy parameters, the indirect ray-paths including reflections from geological formation elements and/or lithologic horizons that surround the borehole and that are at angles different from that of the axis of the borehole.

In one embodiment, the processing means comprises means for measuring the anisotropic phase slowness over a two-dimensional suite of directions, and by constructing a slowness-surface plot, that is, a graph of vertical phase slowness versus horizontal phase slowness. This plot can also be interpreted as a plot of inverse phase velocity as a function of plane-wave propagation direction, by which one can measure phase slowness along the direction of the borehole.

In another embodiment of the invention, a high resolution method is disclosed for measuring seismic polar anisotropy in-situ in a region of interest characterized by geological formation elements that reflect sonic energy. In that embodiment the process comprises the steps of: using a source to input sonic energy into the subsurface of the region of interest; recording sonic energy reflected from the subsurface of the region of interest by using a plurality of sonic receivers that are located in a borehole that is located in the subsurface of the region of interest, wherein the borehole having an axis that is deviated from the vertical by a known angle; and interpreting the recorded sonic energy of the receivers in terms of both the direct raypaths from the source to the receivers and the indirect raypaths from the source to the receivers to obtain a measure of the seismic polar anisotropy parameters $V_0$, $\eta$, and $\delta$.

Numerous advantages and features of the present invention will become readily apparent from the following detailed description of the invention, the embodiments described therein, from the claims, and from the accompanying drawings.

DETAILED DESCRIPTION

Figure 1:
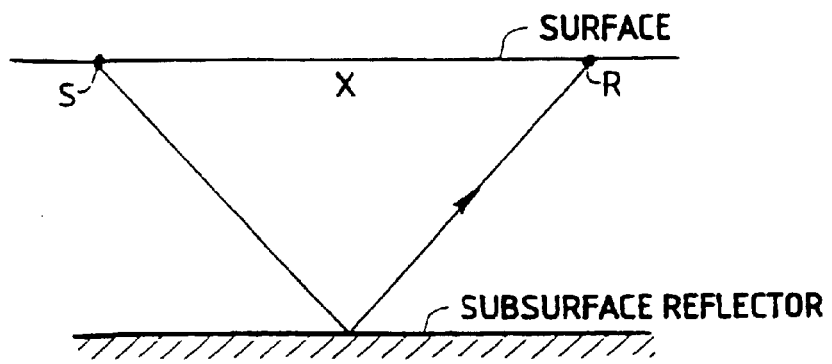
FIG. 1 is an elementary diagram depicting a basic seismic reflection experiment.

While this invention is susceptible of embodiment in many different forms, there is shown in the drawings, and will herein be described in detail, two specific embodiments of the invention. It should be understood, however, that the present disclosure is to be considered an exemplification of the principles of the invention and is not intended to limit the invention to any specific embodiments or algorithms so described.

Figure 3:
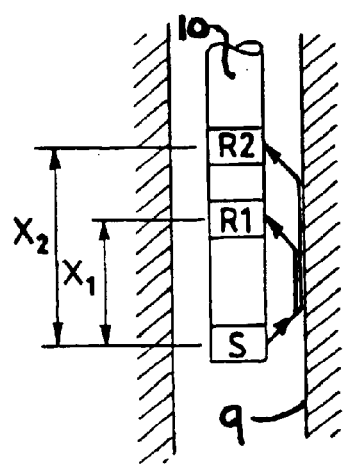
FIG. 3 is a representation of conventional seismic reflection measurement tool in a vertical borehole.
Figure 6:
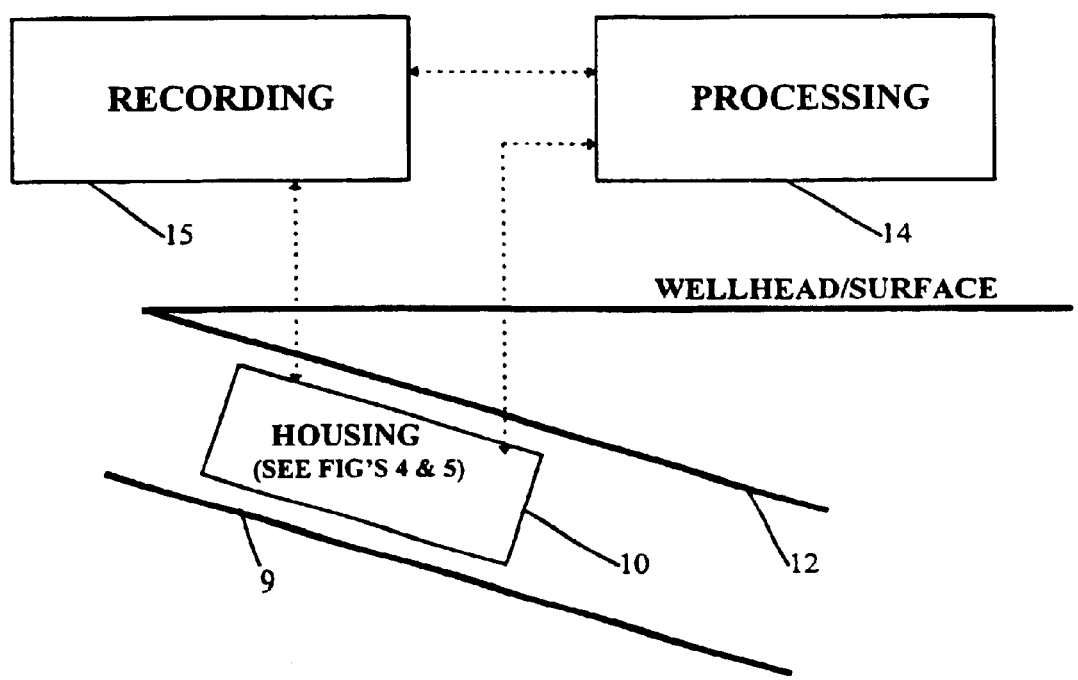
FIG. 6 is a block diagram of one embodiment of the invention.

The first step is to obtain seismic data in the form of seismic signal traces distributed over a two or three dimensional volume of the earth. Methods by which such data is obtained and reduced to digital form for processing as 2-D or 3-D seismic data are well known to those skilled in the art (see FIG. 6). In one embodiment of the invention, a sonic logging instrument, sonde or tool 10 is used. The sonde 10 fits within a borehole 9 and is in communication with a recording system 15 at the wellhead. The logging instrument or tool 10 may be of conventional design. It may also be modified to suit the novel processing 14 employed by the present invention. Modifications may include a larger power supply (for greater range), a lower source frequency (for greater range), increased receiver spacing, additional receivers, tool centering devices, and tool excentering devices. Referring to FIG. 3, a borehole source S of sonic P-waves transmits sonic waves which refract along the P-waves and are received at an array of receivers $R_1$ through $R_n$ carried by the tool 10.

The arrival times of the waves in a vertical borehole in a polar anisotropic formation are given by:

$$t = t_1 + \frac{x}{V_0} \tag{12}$$

where $t_1$ is the arrival time at the first receiver $R_1$, and x is the offset measured from the first receiver $R_1$. The moveout is linear, rather than hyperbolic, as in Equation (7), since the wave travels in a straight line along the borehole walls 12 (i.e., no reflections). The vertical velocity $V_0$ is the average velocity over the array aperture (i.e., a few feet). In a conventional deployment (i.e., a vertical borehole), the waves travel in only one direction (i.e., along the axis of the borehole 9), so that no determination of anisotropy in-situ is possible.

Figure 4:
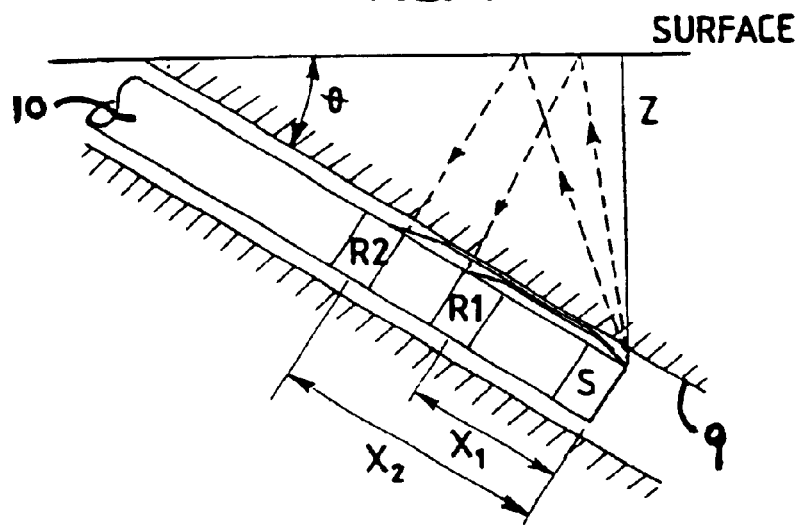
FIG. 4 is a representation of a seismic measurement tool located in a borehole which is not vertical and in which signals are processed in accordance with one aspect of the present invention.

Referring to FIG. 4, in a polar anisotropic medium, if the borehole 9 is deviated from the vertical at angle $\theta$, then the arrival times of the direct wave refracted along the borehole are:

$$t = t_1 + \frac{x}{V_p(\theta)} \tag{13}$$

where $V_p(\theta)$ is given by Equation (4). The present invention makes use of the other, indirect ray-paths shown in FIG. 4, using the same tool in the same context, to determine the anisotropy with higher resolution.

In a deviated borehole, there will be reflected arrivals, as shown, coming from the ubiquitous horizontal layering. These arrivals have been utilized by others (Utard, M., C. Naville, and N. Rehbinder, "Study of Reflected Events Observed on Micro-seismograms Recorded With the EVA® Acoustic Logging System," 9th Intl. Formation Evaluation Transactions, 1984, Soc. Prof. Well Log Analysts (Paris); and Fortin, J. P., N. Rehbinder, and P. Staron, "Reflection Imaging Around a Well With the EVA Full-waveform Tool", The Log Analyst, 1991, May–June, pp. 271–278, the teachings of both are incorporated herein by reference) to construct "micro-seismograms" of the near-borehole environment. The "EVA" tool used by these workers was a logging instrument that was specially modified (e.g., in source-receiver offset, source characteristics, etc.) from more conventional designs, in ways that optimized the reception of these reflections. However, velocity information, as in the present invention, was not used to estimate anisotropy.

Figure 2:
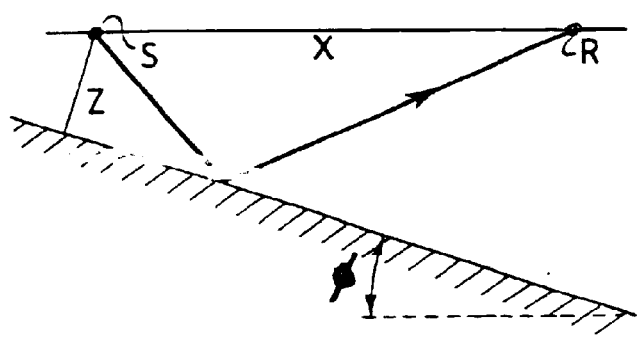
FIG. 2 is an elementary diagram depicting a seismic reflection experiment with a dipping horizon.

Those familiar with surface seismic reflections over dipping media will recognize that this geometry is closely related to that of the "dip-movement" problem (see FIG. 2, and Tsvankin, I. "Normal Moveout From Dipping Reflectors in Anisotropic Media," Geophysics, 1995, 60(1), pp. 268–284, the teachings of which are incorporated herein by reference), with a similar result for the arrival times of the reflected waves:

$$t^2(x) = t_0^2 + \frac{x^2}{V_{mo}^2} + \left(\frac{2t_0 x}{V_{mo}}\right)\sin\theta \qquad (14)$$

where the hyperbolic moveout velocity parameter $V_{mo}$ is given by Equation (8) (i.e., it contains the anisotropic correction factor $\sqrt{1+2\delta}$).

In accordance with one aspect of the present invention, data from the sonic tool 10 is treated exactly like surface seismic data to estimate this moveout parameter. For example, the data may be sorted into "Common Mid-Point (CMP) gathers," and maximum semblance methods may be used to determine the best value for $V_{mo}$.

As the sonde 10 moves through the borehole 9, it generates a set of source-receiver ray-paths that are similar in geometry to a moving single-ended shot spread in surface acquisition practice, and very much like a marine towed-streamer survey. If there are multiple reflectors nearby, it is even better than a towed-streamer survey. It is more like a group of towed-streamer surveys each done with different water depths, and even different water "tilts".

The results may be processed directly using Equation (14), estimating the "Dip MoveOut" parameters $V_{mo}$ and $t_0$, via any of a number of conventional "DMO processes", with the angle $\theta$ known, in this application, from the borehole trajectory. Also, the parameters $V_{mo}$ and to may be determined by methods of pre-stack or post-stack migration, or reflection tomography. Either way, this yields along with Equation (13) a second independent equation for the three anisotropy parameters.

A third equation is provided simply by Equation (9), with z known from the borehole trajectory.

These three Equations (9, 13 and 14) are usually sufficient to determine the three anisotropy parameters ($V_0$, $\delta$, and $\eta$) with a resolution of a few meters, depending on the details of the geometry of the tool, the source characteristics, and the attenuation of the formation.

Furthermore, if non-hyperbolic moveout from the reflections is detectable within the span of available source-receivers separations, then this non-hyperbolic moveout can furnish a fourth equation (See Tsvankin and Thomsen, 1994, supra; and Alkhalifah, supra) that can be used to provide an over-determined set of four equations in three unknowns, which can be solved for a more robust determination of these unknowns, complete with error estimates.

A More General Embodiment

Thinking of a source and a receiver in homogeneous two dimensional space, one can imagine freely moving them about, and getting the direct arrival time for any combination of source and receiver positions. Since the medium is homogeneous, all that matters is the (vector) off-set from source to receiver, call that offset ($X_0$, $Z_0$).

For a given source-receiver offset ($X_0$, $Z_0$), if one perturbs $X_0$ around that value, then one can directly measure the horizontal phase slowness for that ($X_0$, $Z_0$). Similarly, by perturbing $Z_0$, one can measure the vertical phase slowness for that ($X_0$, $Z_0$). By doing that for several different values ($X_0$, $Z_0$), one can directly construct a slowness-surface plot (i.e, a graph of vertical phase slowness versus horizontal phase slowness). This can also be viewed as a plot of inverse phase velocity as a function of plane-wave propagation direction. Gaiser (Gaiser, J., "Transverse Isotropic Velocity Estimates From Slowness and Displacement Measurements", Ph.D. Thesis, 1989, University of Texas at Dallas, the teachings of which are incorporated by reference) did exactly this, using multi-offset (to perturb $X_0$) and multi-depth (to perturb $Z_0$) Vertical Seismic Profiles (VSP's). Gaiser used sources located on the surface and receivers located in vertical boreholes.

In the present context, the luxury of a horizontal array of (fixed) sources and a vertical array of receivers is absent. Instead, the sonde 10 provides an array of sources and receivers (out to some maximum and minimum offsets) spaced along the borehole 9. The usual logging process notes that the source excites dispersive waves which are guided by the borehole walls 9 and which, for low frequencies, propagate with the medium's phase velocity in the direction of the borehole 9. Thus, by using low frequencies and analyzing the first breaks, one can determine (using standard borehole logging techniques) a single point on the anisotropic slowness-surface plot.

With this insight, the problem is then one of how to make measurements over a range of propagation directions, instead of just the single direction given by the borehole. An important concept of this invention is that one can increase the dimensionality of measurements made by a borehole tool 10 by making use of seismic energy that has been reflected off of geological surfaces with a known orientation (geological strata, faults, the ocean bottom, or the surface of the ground).

This is a new circumstance that becomes possible because use is made of a deviated borehole, drilled at an angle to the geology and/or to the surface.

By contrast, in the textbook case of layer-cake geology, seismic isotropy and a vertical borehole, the reflections from the layers provide no additional anisotropy information, because the ray-paths from source to receiver are all parallel.

In the general case with a tilted borehole, arbitrary layer orientations, and general anisotropy, the extra information is complicated to make use of, requiring an anisotropic inversion problem to solve for the anisotropy.

Figure 5:
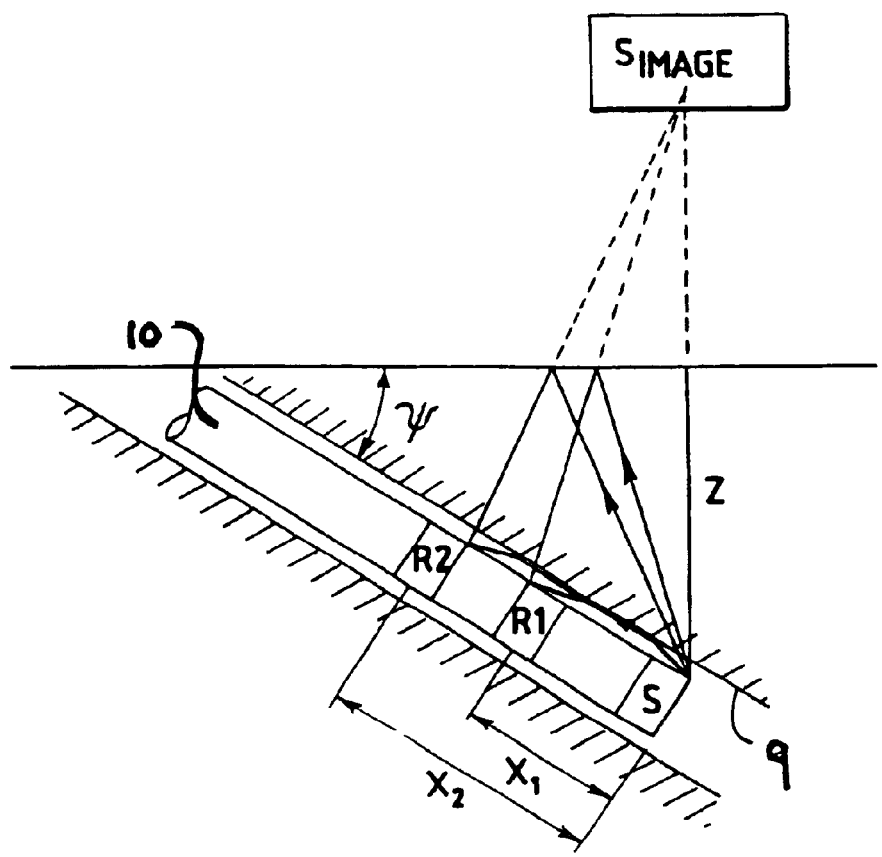
FIG. 5 is a representation of seismic measurement tool located in a borehole which is not vertical and in which signals are processed in accordance with another aspect of the invention.

However, in the simpler case of polar anisotropy considered here, with a vertical symmetry axis and with vertical or horizontal reflectors, there is a simple geometrical interpretation of the reflected arrivals. Because the reflectors are a symmetry plane of the anisotropy, the incident and reflected angles at the reflector are equal. This allows us to use a standard geometrical artifice—image reflecting the source position through the plane of the reflector—to create an "image source" ($S_{image}$, of FIG. 5). Kinematically, the arrivals can then be processed as if they were direct arrivals from the image source $S_{image}$. In other words, as long as the borehole 9 is not entirely perpendicular to the reflector, one can convert the textbook one-dimensional borehole geometry into an effective two-dimensional borehole geometry, by using the mirror-image of the source in place of the "real" source.

By this means, the borehole geometry has been converted into something like Gaiser's geometry. Then, by perturbing the receiver position, one can measure phase slowness along the direction of the borehole. And, by perturbing the source position, one can measure phase slowness along the direction of the image of the borehole. Just as in Gaiser's situation, one is directly finding points on the phase-slowness plot, but using a non-orthogonal coordinate system to do it (i.e., using the vector pointing along the borehole direction, and the vector pointing along the direction of the image of the borehole). This process becomes more uncertain as these two vectors are more parallel. For layer-cake geology, the optimum dip of the well is 45 degrees, in which case the borehole and the image of the borehole are perpendicular.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Similarly, it should be understood that the disclosure, and claims which follow, are exemplifications of the principles of the invention. There is no intent to limit the invention to any particular set of anisotropy parameters, moveout equations, or mathematical algorithms. Almost any equation that could be applied to surface geometry, could be applied to the environment of the present invention. With enough data, one might be able to get all 21 elastic constants of a general anisotropic medium. For example, if there were several fault planes nearby, with different strikes and dips, one could probe the medium with raypaths along a wide variety of azimuths and dips. That might be enough to determine the complete 3-dimensional local anisotropy. Moreover, equivalent computations may be substituted for those illustrated and described. For example, equation (11) of Tsvankin 1995 (supra) can be used in lieu of present Equation (8) when the reflector's normal coincides with the direction of symmetry and the moveout velocity is a function of the dip angle. Similarly, the more exact equations (10 through 17) of Thomsen 1986 (supra) can be used in lieu of present Equation (4). Also, the more general equations of Tsvankin and Thomsen 1994 (supra) and Tsvankin 1995 (supra) may be used to replace and augment the particular equations disclosed herein. Thus, it will be appreciated that various modifications, alternatives, variations, and changes may be made without departing from the spirit and scope of the invention as defined in the appended claims., It is, of course, intended to cover by the appended claims all such modifications involved within the scope of the claims.

We claim:

1. A high resolution method for measuring seismic polar anisotropy in-situ in a region of interest characterized by geological formation elements that reflect sonic energy, comprising the steps of:
   (a) using a sonic energy source located in a borehole to input sonic energy into the subsurface of the region of interest;
   (b) recording sonic energy from step (a) reflected from the subsurface of the region of interest by using a plurality of sonic receivers that are located in said borehole that is located in the subsurface of the region of interest; said borehole having an axis that is at a known acute angle relative to at least one of the geological formation elements of said region; and
   (c) interpreting said recorded sonic energy of said receivers in terms of both the direct raypaths from said source to said receivers and the indirect reflected raypaths from said source to said receivers to obtain a measure of the seismic polar anisotropy parameters $V_0$, $\eta$, and $\delta$.

2. The method of claim 1, wherein said source and said receivers are carried by a sonde that is adapted for axial movement within said borehole.

3. The method of claim 2, wherein said axis of said borehole is at an acute angle relative to the surface above said region; and wherein said geological formation elements comprise at least one of a bedding horizon, a fault, and a layer boundary having a generally horizontal orientation relative to said surface above said region.

4. The method of claim 2, wherein said geological formation elements comprise at least one of a dipping bedding horizon, a dipping fault, and a dipping layer boundary.

5. The method of claim 3, wherein the indirect raypaths of step (c) include reflections from geological formation elements comprising a plurality of lithologic horizons that are traversed by said borehole at an angle that is greater than zero degrees and less that ninety degrees, and that is preferably about 45 degrees; and wherein said axis of said borehole is deviated from the vertical.

6. The method of claim 5, wherein step (c) comprises the step of measuring the anisotropic phase slowness over a two-dimensional suite of directions, thereby characterizing the anisotropy of that part of the subsurface traversed by said raypaths.

7. The method of claim 6, wherein said anisotropic phase slowness is measured over a two-dimensional suite of directions by at least performing the following steps:
   (a) perturbing the positions of said receivers, and
   (b) measuring phase slowness along said axis of said borehole.

8. The method of claim 6, wherein said anisotropic phase slowness is measured over a two-dimensional suite of directions by at least performing the following steps:
   (a) perturbing the position of said source, and
   (b) measuring phase slowness along the direction of an image of said borehole.

9. The method of claim 6, wherein step (c) is performed by finding points on a plot of phase-slowness, and using a non-orthogonal coordinate system to do so.

10. The method of claim 9, wherein said non-orthogonal coordinate system is defined by a vector pointing along said axis of said borehole, and by a vector pointing along the direction of an image of said borehole.

11. The method of claim 10, wherein said borehole is inclined at about 45 degrees, such that said borehole and said image of said borehole are generally perpendicular to each other.

12. The method of claim 6, where in step (b) said recordings comprise waveforms excited by said source; and wherein step (c) comprises the steps of:
   (a) plotting said recorded waveforms as a function of time t and each source-receiver offset s;
   (b) identifying, on said plot of recorded waveforms, the arrival times of equal phase-points; and
   (c) measuring the slope ds/dt of a curve connecting said arrival times to determine the apparent phase velocity in the s-direction, whereby the inverse (dt/ds) of said slope is the corresponding phase slowness.

13. The method of claim 12, wherein said waveforms are direct reflected waveforms; and wherein said equal phase points are the peaks of corresponding arrivals.

14. The method of claim 5, wherein step (c) includes the step of computing $$V_p(\theta) = V_0[1 + \delta \sin^2\theta + \eta \sin^4\theta]$$

where $V_p(\theta)$ is the sonic P-wave velocity as a function of the angle of propagation $\theta$ with respect to the symmetry axis of the medium defined by said lithologic horizons.

15. The method of claim 5, wherein said raypaths include:
 a. a direct borehole-parallel path, with arrival times that are a function of $$t_1 \text{ and } \frac{x}{V_p(\theta)}$$

where $t_1$ is the arrival time at the first receiver, x is the offset of a given receiver measured from the source and measured parallel to said borehole, and $V_p(\theta)$ is the sonic P-wave velocity as a function of the angle of propagation $\theta$ with respect to the symmetry axis of the medium defined by said lithologic horizons;
 b. an indirect normal-incidence path, with arrival times that are a function of:

$$t_0 \text{ and } \frac{x}{V_{mo}}$$

where $t_0$ is the time for normal-incidence reflection for the depth from said source to said reflectors comprising geological formation elements and $V_{mo}$ is the moveout velocity; and
 c. an indirect path of reflections from said lithologic horizons, with arrival times that are a function of:

$$t_0, \frac{x}{V_{mo}}, \text{ and } \sin\theta.$$

16. The method of claim 15, the anisotropy parameter $\delta$ and the vertical velocity $V_0$ are related to said moveout velocity by:

$$V_{mo} = V_0\sqrt{1+2\delta}.$$

17. The method of claim 15, wherein the anisotropy parameter $\delta$ and the vertical velocity $V_0$ are related to said moveout velocity by:

$$V_{mo} = V_0(1+\delta).$$

18. The method of claim 15, wherein said plurality of lithologic horizons are dipping; and wherein the anisotropy parameter $\delta$ and the vertical velocity $V_0$ are related to said moveout velocity by:

$$V_{mo} = \frac{V_o(\phi)}{\cos\phi}\sqrt{1 + \frac{1}{V_o(\phi)}\frac{d^2 V_o}{d\theta^2}}$$

where $\phi$ is the dip angle of the lithologic horizon traversed by said sonde in said borehole.

19. The method of claim 6, wherein said anisotropic phase slowness is measured over a two dimensional suite of directions by at least performing the following steps:
 (a) comparing recorded waveforms at adjacent receivers; and
 (b) measuring phase slowness along said axis of said borehole.

20. The method of claim 6, wherein said anisotropic phase slowness is measured over a two dimensional suite of directions by at least performing the following steps:
 (a) comparing recorded waveforms generated by a plurality of nearby sources; and
 (b) measuring phase slowness along said axis of said borehole.

21. Apparatus for measuring seismic polar anisotropy in-situ in a region of the earth that is characterized by geological formation elements that reflect sonic energy and that comprise a plurality of lithologic horizons, comprising:
 (a) a housing that is adapted to travel within a borehole having at least one section that has an axis that is deviated from the vertical by a known acute angle and that is located at a known depth, said housing carrying at least one source of acoustic energy into the geological formation elements and a plurality of receivers for receiving acoustic energy from geological formation elements and said source;
 (b) a recording system, comprising elements that are located at the wellhead of said borehole and that are in communication with said source and said receivers, for receiving data therefrom; and
 (c) means for operating said source and said receivers and for processing data from said recording system in terms of both the direct raypaths from said source to said receivers and the indirect raypaths from said source, through the lithologic horizons that are traversed by said at least one section of said borehole, and to said receivers to obtain measures of at least the seismic polar anisotropy parameters $V_0$, $\eta$, and $\delta$, said indirect ray-paths including reflections from geological formation elements that surround said borehole and at angles different from that of said axis of said at least one section of said borehole, said processing means comprising means for measuring the anisotropic phase slowness over a two-dimensional suite of directions.

22. A method for measuring seismic polar anisotropy in-situ in a region of interest characterized by geological formation elements that reflect sonic energy, comprising the steps of:
 (a) using a sonic energy source to input sonic energy into the region of interest, said source being adapted for movement in a borehole that penetrates the region of interest, that is deviated from at least one of the vertical and said formation elements by a known non-zero acute angle;
 (b) recording sonic energy from said source and from said geological formation elements by using a plurality of axially spaced apart receivers that are adapted for movement In said borehole; and
 (c) Interpreting the recorded signal in terms of both direct raypaths and indirect raypaths to measure at least the seismic polar anisotropy parameters $V_0$, $\delta$, and $\eta$, said indirect ray-paths comprising a plurality of reflections which are from said geological formation elements that surround said borehole, and which arrive at angles different from that of the axis of said borehole,
 wherein the anisotropy parameter $\delta$ and the vertical velocity $V_0$ are related to the moveout velocity $V_{mo}$ by:
 wherein the anisotropy parameters $\delta$ and $\eta$ and the vertical velocity $V_0$ are related to the P-wave velocity by:

$$V_p(\theta) = V_0[1+\delta \sin^2\theta + \eta \sin_4\theta]$$

where $\theta$ is the angle of propagation with respect to the symmetry axis of the medium defined-by said lithologic horizons;
 wherein the spacing x of said plurality of receivers located along the axis of the borehole the P-wave velocity, and the arrival time $t_1$ at the first receiver are related to the arrival times t at the remaining receivers by:

$$t = t_1 + \frac{x}{V_p(\theta)}, \text{ and}$$

wherein said spacing x of said receivers, said moveout velocity, and the dip moveout time $t_0$ are related to said arrival times t by:

$$t^2(x) = t_0^2 + \frac{x^2}{V_{mo}^2} + \frac{2t_0 x \sin\theta}{V_{mo}}.$$

23. A high resolution method for measuring seismic polar anisotropy in-situ in a region of interest, comprising the steps of:
  (a) inputting sonic energy into the subsurface by using a source located in a borehole that penetrates the region of interest and that is deviated from the vertical by a known non-zero acute angle;
  (b) recording sonic energy waveforms at a set of receivers located in said borehole; and
  (c) interpreting the recorded waveforms in terms of both direct raypaths and indirect raypaths by:
    (i) plotting said recorded waveforms as a function of time t and each source-receiver offset s;
    (ii) identifying, on said plot of recorded waveforms, the arrival times of equal phase-points; and
    (iii) measuring the slope dt/ds of a curve connecting said arrival times to determine the apparent phase velocity in the s-direction, whereby the inverse (ds/dt) of said slope is the corresponding phase slowness, wherein said indirect raypaths include reflections from elements within the formations surrounding the borehole and at angles different from that of the axis of the borehole, and from lithologic horizons.

24. The method of claim 23, wherein said waveforms are direct reflected waveforms; and wherein said equal phase points are the peaks of corresponding arrivals.

25. The method of Claim 23, wherein step (c) comprises the step of measuring the anisotropic phase slowness over a two dimensional suite of directions to characterize the anisotropy of the medium traversed by the rays, said step of measuring the anisotropic phase slowness including the steps of:
  (a) comparing recorded waveforms at nearby receivers; and
  (b) measuring phase slowness along said axis of said borehole.

26. The method of claim 23, wherein step (c) comprises the step of measuring the anisotropic phase slowness over a two dimensional suite of directions to characterize the anisotropy of the medium traversed by the rays, said step of measuring the anisotropic phase slowness including the steps of:
  (a) comparing recorded waveforms generated by a plurality of nearby sources; and
  (b) measuring phase slowness along said axis of said borehole.

27. A seismic method, comprising the steps of:
  (a) locating a borehole tool at a non-zero acute angle to the horizon and measuring said acute angle of inclination of said borehole tool, said borehole tool carrying plurality of receivers that are located along the axis of said borehole and that are spaced apart from one another, said borehole tool carrying a seismic source that is spaced apart from said receivers;
  (b) measuring the spacing of each receiver from said source along said axis;
  (c) transmitting seismic energy from a source carried by said borehole tool, and measuring the arrival time at a first receiver that is closest to said source and the arrival times at the remaining receivers;
  (d) obtaining a mathematical relationship between the anisotropy parameter δ, vertical velocity and moveout velocity;
  (e) obtaining a mathematical relationship between the anisotropy parameters δ and η, said vertical velocity, said angle of inclination of a borehole tool and P-wave velocity;
  (f) obtaining a mathematical relationship between said spacing of said receivers along the axis of the borehole, P-wave velocity, said arrival time at a first receiver and said arrival times at said remaining receivers;
  (g) obtaining a mathematical relationship between said spacing of said receivers, said moveout velocity, said angle of inclination, dip moveout time, and said arrival times; and
  (h) using the measurements of steps (a), (b), (c) and the mathematical relationships of steps (d), (e), (f) and (g) to determine measures of at least said seismic anisotropy parameters 8 and η.

28. In seismic exploration of a region of the earth containing-at-least one of a bedding horizon, a fault, and a layer boundary of a known orientation, wherein a borehole tool is used that carries a plurality of receivers that are located at positions x along the longitudinal axis of the tool and that are spaced apart from one another, and that carries a seismic source that is spaced apart from the receivers, a process comprising the steps of:
  (a) locating the borehole tool In a borehole that is inclined to at least one of the orientation of the bedding horizon, the fault and the layer boundary;
  (b) recording waveforms from direct raypaths from the source to the receivers and from the indirect raypaths from the source through at least one of a bedding horizon, a fault, and a layer boundary of a known orientation;
  (c) obtaining a mathematical relationship between the anisotropy parameters δ and η, the vertical velocity $V_0$, the angle of propagation θ with respect to the symmetry axis of the region traversed by the borehole, and the P-wave velocity VP;
  (d) obtaining a mathematical relationship between the spacing of the receivers along the axis of the borehole, said angle of inclination of the borehole, dip moveout time, and said arrival times; and
  (e) using the recorded waveforms of step (b) and the relationships of steps (c) and (d) to obtain the anisotropy parameters $V_0$, δ, and θ.

29. The seismic method of claim 28, where $V_{mo}$ is a function of $V_0$ and δ.

30. The seismic method of claim 29, where $V_{mo} = V_0 \sqrt{1+2\delta}$.

31. The seismic method of claim 28, where $V_p$ is a function of δ, η, and θ.

32. The seismic method of claim 31, where $V_p$ is a function of $V_0$, δ, η and $\sin^2\theta$.

33. The seismic method of claim 32, where $$V_p = V_0 [1 + \delta \sin^2\theta + \eta \sin^4\theta].$$

34. The seismic method of claim 28, where said arrival times are a function of x, $V_{mo}$, sin θ, and the vertical travel time $t_0$.

35. The seismic method of claim 34, where said arrival limes are a function of x, $V_{mo}$, sin θ and the vertical travel time $t_0$.

36. The seismic method of claim 35, where:

$$t^2 = t_0^2 + \frac{x^2}{V_{mo}^2} + \frac{2t_0 x \sin\theta}{V_{mo}}.$$

37. The seismic method of claim 28, wherein said at least one of a bedding horizon, a fault, and a layer boundary of a known orientation are dipping; and wherein the anisotropy parameter δ and the vertical velocity $V_0$ are related to said moveout velocity by:

$$V_{mo} = \frac{V_o(\phi)}{\cos\phi}\sqrt{1 + \frac{1}{V_o(\phi)}\frac{d^2 V_o}{d\theta^2}}$$

where φ is the dip angle of said at least one of a bedding horizon, a fault, and a layer boundary traversed by said source and said receiver.

* * * * *